United States Patent Office 2,983,691
Patented May 9, 1961

2,983,691
PREPARATION OF SUPPORTED METAL MOLYBDATE CATALYSTS

Ryden L. Richardson, Fullerton, Calif., assignor to Union Oil Company of California, Los Angeles, Calif., a corporation of California No Drawing. Filed Feb. 4, 1957, Ser. No. 637,871

6 Claims. (Cl. 252—453)

This invention relates to certain novel methods for preparing impregnated catalysts, and especially molybdenum oxide, or metal molybdate catalysts, and to the compositions resulting therefrom. Briefly, the method consists in first saturating the pores and the adsorbent surface areas of a granular carrier with dry ammonia, then contacting the ammonia-saturated carrier with e.g. an aqueous molybdate solution, whereby the ammonia in the carrier is rapidly dissolved, forming a low pressure zone in the interior of each catalyst granule which is rapidly filled with the impregnating solution. The wet granules are then drained, dried and calcined to produce a finished catalyst comprising molybdenum oxide or metal molybdate uniformly distributed throughout the individual granules.

The principal novelty resides in pre-saturating the carrier with ammonia in such manner as to displace substantially all other adsorbed gases. The benefits derived from this operation are at least two-fold:

Firstly, the impregnation is more rapid because the impregnating solution need not displace insoluble gases from the interior of the granules, contrary to the usual occurrence where the carrier is saturated with air. The displacement and emergence of discrete air bubbles from the larger pores mechanically retards the ingress of solution, and the outward diffusion of dissolved air trapped in the smaller micropores may require several minutes or hours for completion. Consequently, where the solution must displace air or other insoluble gas, a uniform impregnation over the entire active area may be objectionably slow. However, when ammonia is used, maximum completeness and uniformity of distribution is usually obtainable in from about 15 seconds to 10 minutes.

Secondly the precipitation of relatively insoluble molybdenum compounds during impregnation is prevented, thereby minimizing uneven distribution within the catalyst granules. Molybdenum is normally impregnated on carriers via a cool ammoniacal solution of a molybdate, e.g. ammonium molybdate, or cobalt molybdate. In the initial stages of impregnation, considerable heat is evolved due to adsorption and wetting. The highest temperatures occur locally at the solid-liquid interfaces, and may raise the gross liquid temperature to as high as 150° F. The high temperatures tend to throw ammonia out of solution locally, and to displace the equilibrium from normal molybdate to the less soluble paramolybdate:

$$7(NH_4)_2MoO_4 \rightleftharpoons (NH_4)_6Mo_7O_{24} \cdot 4H_2O + 8NH_3$$

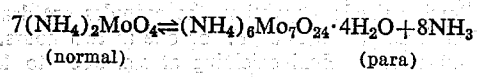

The presence of excess ammonia at the exact sites of greatest heat concentration is found to aid materially in keeping the impregnating solutions homogeneous and avoiding local precipitation and consequent uneven deposition of molybdenum. Even though some precipitation may occur, the rapidity with which the solution is sucked into the catalyst pores, precludes the formation and deposition of large crystals in the outer layers, such as would lead to blocking of pores and uneven distribution.

In the preparation of catalysts involving a complex active ingredient, e.g. cobalt molybdate, or nickel molybdate, the above advantages are even more significant. One method for preparing such catalysts involves a single impregnation with an ammoniacal solution of cobalt or nickel molybdate, as is more particularly described in U.S. Patent No. 2,486,361. This method suffers from the disadvantage that it is difficult to maintain the more basic oxide-forming metal (cobalt or nickel) in solution except under carefully controlled conditions of ammonia concentration. When the carrier contacts the solution, the heat of adsorption decreases the local ammonia concentration at the interfaces as noted above, resulting sometimes in a heavy deposition of precipitated oxides near the exterior of each granule. This precipitate tends to block the catalyst pores and retards the further sorption of solution into the interior of the granules. While this problem may be overcome to some extent by maintaining careful control over temperatures and concentrations of metals and ammonia, a simpler method not requiring careful control would be highly desirable.

The present invention provides such a method. By providing an instantaneous excess of ammonia at the interfaces, local deficiencies are automatically compensated. Moreover, here again the rapidity of sorption aids materially in obtaining an even distribution of active metals by insuring a complete distribution of liquid within the pores before any precipitated crystals have had time to grow sufficiently to block the pores. Impregnation as described herein ordinarily does not involve the generation of any more heat than occurs during the conventional impregnation, and sometimes, depending upon the nature of the carrier, less overall heat is generated. The controlling factor here is whether the heat of adsorption and wetting of the carrier by ammonia is greater or less than the heat of solution of ammonia in the impregnating solution. These figures usually do not differ greatly, and hence the overall quantity of heat generated during impregnation does not differ significantly from that generated by impregnating ammonia-free carriers. The overall result is that rapid, homogeneous, and complete impregnation is obtained in a simple manner not requiring elaborate control measures.

From the foregoing, it will be apparent that the principal object of the invention is to provide methods whereby molybdate impregnation solutions may be rapidly, uniformly and completely distributed within porous, granular carriers. Another object is to provide convenient measures for preventing the precipitation of metallic components during molybdate impregnations, whereby a more uniform distribution is obtained. A still further object is to provide methods whereby two active components, i.e. molybdenum and cobalt, or molybdenum and nickel, may be simultaneously impregnated on porous carriers to obtain a rapid and uniform distribution of each component with respect to the carrier, and to each other, over the entire surface area of the catalyst. Other objects will be apparent from the more detailed description which follows.

The adsorbent carriers employed herein may comprise any of the conventional adsorbent materials such as activated alumina, silica, silica-alumina, acid activated clays, zirconia, titania, magnesia, beryllia, thoria, etc., or any combination thereof. Materials such as adsorbent, activated charcoal may also be employed. Normally, such carriers are compressed into the form of tablets ranging in size from about ⅛" to about 1" in diameter. Alternatively, the carriers may be prepared in the form of irregular lumps by breaking up larger conglomerates. Also, the powdered materials may be mixed with wetting agents and binders to form a paste, and the paste extruded under pressure through suitable orifices, the extrudate being broken up into pellets of any desirable length. The process of this invention is highly advantageous when impregnating particles of relatively large size, e.g. from about ⅛″ to 1″ in diameter. When the carrier is in powdered form, or in the form of much smaller particles, the benefits of the invention are not so marked, but nevertheless are significant.

A particularly preferred class of carriers comprise activated alumina and mixtures thereof with small amounts of coprecipitated silica. Compositions made up of alumina plus about 3% to 15% by weight of coprecipitated silica are especially preferred from the standpoint of thermal stability.

After shaping the carrier into the particular form desired, it is normally subjected to a calcining treatment involving heating at temperatures of about 500° to 1500° F. for about one to 24 hours. This calcining treatment expels substantially all water and adsorbed gases, and at this point the carrier is in a desirable condition for saturation with ammonia in accordance with the invention.

The ammonia saturation is preferably conducted at a low temperature, e.g. 0 to 200° F., in order to insure maximum adsorption. The calcined carrier, while still in the calcining chamber, may be contacted with dry ammonia gas until it is substantially saturated. This usually requires from about one to 30 minutes, depending upon the specific nature of the carrier, and the contacting conditions. Preferably a stream of ammonia gas is continuously passed through a bed of the carrier particles, thereby sweeping out any traces of displaced air and water, and hastening the adsorption. Completion of the adsorption is indicated when no further changes in static ammonia pressure occur.

In one modification the carrier may be enclosed in a pressure vessel, and saturated by admitting ammonia gas under pressure, or ammonia in the liquid phase. In still another modification, the catalyst may be supported in a pressure vessel and a stream of ammonia gas passed therethrough, while continuously pulsating the pressure in the vessel, as for example, by using a large piston pump to admit each increment of ammonia. The pulsating pressure causes the gases in the pores of the catalyst alternately to expand and contract; the pellets in other words are caused to "breathe." In this manner, saturation is hastened by supplementing the slower process of diffusion. Obviously many other feasible methods of saturating the carrier with ammonia will occur to those skilled in the art. The essential requirement is merely that substantially all other gases and water vapor be displaced therefrom, and a substantial amount of ammonia adsorbed onto the surface of the carrier. These procedures of course will inherently result also in filling the pores of the catalyst with ammonia gas.

Following the adsorption of ammonia the carrier is then in condition for impregnation. The impregnating solution is an ammoniacal aqueous solution of ammonium molybdate, or ammonium molybdate plus soluble ammonia complexes of cobalt or nickel. The total concentration of metal or metals in the solution may range anywhere between about 0.1 and 3.0 gram-atoms per liter. Under unusual conditions, concentrations below or above this range may sometimes be encountered, and all such solutions are contemplated herein. The controlling factor as to concentration is primarily the amount of metal desired in the final catalyst. Concentrations as above suggested lead to catalysts containing between about 1.0% and 25% by weight of metals, calculated as oxides.

When the impregnating solution contains only ammonium molybdate, any suitable excess of ammonia may be present. Ammonium molybdate solutions which are 0.5 to 15 molar with respect to ammonia are contemplated.

In the case of impregnation with complex solutions comprising molybdenum and either cobalt or nickel, it is necessary to observe certain further limitations in order to keep all the components in solution. It is hypothesized that the basic oxide-forming metal (cobalt or nickel) remains in solution by virtue of formation of soluble ammonia complexes. In order to keep such metals in solutions it is necessary to employ at least about 4 moles of ammonia per mole of such metal. This insures that the hydroxides initially formed will be redissolved, if the ammonia concentration (relative to the volume of solvent) is sufficiently high. The overall concentration of ammonia should range between about 4 and 17 molar, preferably between about 10 and 14 molar.

The above limitations normally will also insure that the molybdenum, if added in the form of normal ammonium molybdate, will also remain in solution. Where the molybdenum is added in the form of the para-molybdate, it may be necessary to insure that sufficient excess ammonia is present to form the normal molybdate, and to yield the excess values required in relation to the cobalt or nickel. Observation of all these restrictions normally results in a stable solution of molybdenum and the basic oxide-forming metal.

The mole-ratio of molybdenum to cobalt or nickel in the impregnating solution is not critical herein, and is determined mainly by the desired relative concentrations in the final catalyst. Normally, it is preferable that the molybdenum component (calculated as $MoO_3$) should be present in slight mole excess over the cobalt component (calculated as CoO). About 0.5 to 3.0 moles of molybdenum per mole of cobalt is within the usually desirable range. The relative concentration of metals in the impregnating solutions may hence be about the same. Similar mole-ratios apply in the case of molybdenum and nickel.

The technique of impregnation is well understood by those skilled in the art and hence need not be described in detail. Normally, the ammoniated carrier is simply immersed, continuously or batchwise, in the solution for between about 15 seconds and 10 minutes, then removed, drained and dried. When the carrier is not presaturated with ammonia, the impregnation time normally ranges between about 20 minutes and several hours if maximum uniformity of impregnation is desired. According to the present invention, no advantage is gained by continuing the impregnation for longer than about 10 minutes, and generally less than 5 minutes is sufficient. The advantages of uniform and rapid impregnation are also obtained when other techniques are used, as for example spraying the solution onto a moving stream of the carrier. Sometimes a sufficient concentration of active metal is not obtainable in one impregnation; in such cases the once-impregnated material may be dried, re-ammoniated if desired, and then again immersed in the solution, and this may be continued until suitable concentrations are achieved.

The basic oxide-forming metals may be employed in the form of any of their soluble salts. It is preferable to employ salts which upon final calcining are decomposed to the oxide without leaving deleterious anions on the carrier. The nitrates, sulphates, acetates and the like are suitable examples.

Following the impregnation, the granules are drained, dried at e.g. 200° to 500° F. for one to two hours, and then subjected to final calcining at e.g. 500° to 1500° F. for one to 24 hours. Final calcining converts the impregnated materials to various oxide forms. Where molybdenum is impregnated simultaneously with cobalt or nickel, the final calcined deposit is thought to comprise at least partly a molybdate of cobalt or nickel, i.e. $CoMoO_4$ or $NiMoO_4$. However, depending upon the carrier employed and its relative affinity for each component, a portion of the impregnated metals is undoubtedly present in combined form with the carrier as e.g. cobalt aluminate, and other portions will be present as the free oxides, CoO, NiO, MoO₃, etc.

The process of the present invention is believed to lead to compositions containing a higher ratio of nickel molybdate or cobalt molybdate, as compared to the single oxides. This follows from the observation that the rapid and homogeneous impregnation tends to prevent the segregation of one or the other components into zones of the catalyst particle where it is not available for combination with the other component during calcining. For example, if the conditions were such that cobalt was selectively precipitated near the exterior of the catalyst granules, then the interior would be relatively concentrated in molybdenum; final calcining would then yield less cobalt molybdate than would be the case if the two materials were homogeneously distributed with respect to each other.

The finished catalysts of this invention may be employed in many and varied hydrocarbon conversion reactions such as desulfurization, denitrogenation, reforming, dehydrogenation, hydrocracking, and the like. For example, in desulfurization, the cobalt molybdate or nickel molybdate catalysts supported on a silica-stabilized alumina carrier may be employed to desulfurize various hydrocarbon fractions, e.g. gasolines, kerosenes, gas oils, and even crude oils. The temperatures for this process normally range between about 600° and 900° F., pressures between about 50 and 3000 p.s.i.g., liquid hourly space velocities between about 0.2 and 10, and hydrogen ratios between about 50 and 5000 s.c.f. per barrel of feed.

In the process generally referred to as reforming, or "hydroforming," the molybdenum oxide catalyst, or the cobalt molybdate catalyst supported on alumina or silica-stabilized alumina may be employed for the upgrading of gasolines at reaction temperatures of about 800° to 1100° F., pressures between about 100 and 600 p.s.i.g., space velocities between about 0.2 and 4.0, and hydrogen rates of about 500 to 10,000 s.c.f. per barrel of feed. Such a process may be employed to effect aromatization and isomerization, resulting in substantial improvements ing octane rating. Simultaneously, efficient desulfurization and denitrogenation may be obtained.

Where the catalyst is employed primarily for denitrogenation, substantially similar conditions to those employed for desulfurization may be employed, except that slightly higher temperatures are usually preferable, e.g. from about 750° to 1000° F.

Any of the catalysts herein described may also be employed for hydrocracking high-boiling stocks, e.g. gas oils or cracking cycle stocks, to produce substantial yields of gasoline-boiling-range material. The conditions optimum for hydrocracking include temperatures of about 800° to 1100° F., pressures between about 500 and 5000 p.s.i.g., space velocities between about 0.2 and 4, and hydrogen rates between about 500 and 10,000 s.c.f. per barrel of feed. In hydrocracking, the preferred carriers are the acidic compositions such as acid treated high-silica clays, synthetic silica-alumina gels containing e.g. 60 to 90% silica, silica-zirconia, silica-zirconia-alumina, and the like. These acidic carriers are also advantageous for denitrogenation. The silica-stabilized aluminas previously described, which contain only about 3 to 15% of silica, are not highly acidic, and hence are not predominantly cracking catalysts, and are used mainly where hydrocarbon cracking reactions are not desired.

The following examples are cited to illustrate feasible methods of preparation, but are not intended to be limiting in scope:

Example I

A molybdenum oxide catalyst on silica-stabilized alumina is prepared as follows:

First, the carrier containing an estimated 95% $Al_2O_3$ and 5% $SiO_2$ is prepared by coprecipitation of an aqueous mixture of sodium aluminate and sodium silicate with $CO_2$. The precipitate is washed and dried at 90°–110° C., then compressed into ¼" pellets, and finally activated by heating for 2 hours at 600° C.

The activated carrier is then placed in a vessel and ammoniated by passing a stream of dry ammonia through the bed at room temperature for 20 minutes. At the end of the 20-minute period, the outlet is closed and the vessel pressured up to about 3 atmospheres with ammonia and allowed to stand for another 10 minutes.

A solution of ammonium molybdate is prepared by dissolving about 1700 parts by weight of ammonium paramolybdate, assaying about 81% by weight of $MoO_3$, in about 1940 parts by weight of 28% aqueous ammonia and about 1550 parts by weight of distilled water.

The pressure is then released from the vessel containing the ammoniated carrier, and the contents (4400 parts by weight) are immediately immersed in the impregnation solution. The solution heats up slightly, but no visible evolution of gas is observed following the initial immersion, in contrast to the considerable evolution usually observed when non-ammoniated carriers are submerged. After soaking for 5 minutes, the catalyst is drained, dried and heated at 600° C. for 2 hours. The final catalyst is found to contain about 9.3% by weight of evenly distributed molybdenum oxide.

Example II

A molybdenum oxide-cobalt oxide catalyst on silica-stabilized alumina is prepared as follows:

The carrier is prepared and ammoniated as described in Example I.

The impregnating solution is prepared by adding slowly with stirring, 292 ml. of a 3.4 molar solution of cobalt nitrate to 500 ml. of 28% ammonium hydroxide and 100 ml. of distilled water. The slight pink precipitate initially observed is immediately redissolved. To this solution is then added 171.5 gms. of ammonium paramolybdate over a period of about 5 minutes. To 1 liter of the final solution is then added 1170 gms. of the ammoniated carrier, and soaking is continued for about 5 minutes. The impregnated material is then removed, drained, dried for about 4 hours at 110° C., and calcined at 600° C. for 2 hours. The resulting product contains about 3% of cobalt calculated as CoO, and 6% of molybdenum calculated as $MoO_3$. Upon cutting one of the impregnated pellets in half, it is observed that the cross-sectional area is an even blue color throughout, showing that uniform impregnation was obtained.

A catalyst prepared by similarly impregnating the un-ammoniated carrier for 5 minutes is found upon inspection of the pellet cross-section to display a color gradient, i.e. the outer layers are purplish-blue, while the core is almost white. This clearly demonstrates the effectiveness of the ammoniation step.

Example III

A 3% nickel oxide, 6% molybdenum oxide catalyst is prepared as outlined in Example II, merely substituting a moleequivalent amount of nickel nitrate for the cobalt nitrate. A catalyst of uniform green color is obtained.

By substituting in the above examples any of the other adsorbent carriers previously described, substantially similar results are obtained. In all cases a more uniform impregnation is obtained in shorter contact times.

While the process of this invention has been described with particular reference to molybdenum catalysts, it will be apparent that some of the advantages thereof will accrue in other impregnations with ammonia-soluble metals. Such other metals include for example, chromium, tungsten, manganese, iron, copper, vanadium, zinc and the like. In all these cases, the rapidity of impregnation is increased by presaturating the carrier with dry ammonia.

The true scope of the invention is intended to be embraced by the following claims:

I claim:

1. A method for uniformly impregnating an adsorbent granular carrier in a single impregnation step with ammonium molybdate and with an ammonia complex of a metal selected from the class consisting of cobalt and nickel, said granular carrier having an average particle diameter between about ⅛-inch and one inch, which comprises first contacting said adsorbent granular carrier with dry ammonia to effect a substantial saturation thereof with ammonia, then contacting the resulting ammonia-saturated carrier with an aqueous impregnation solution comprising (1) ammonium molybdate, (2) a salt of said metal, and (3) sufficient ammonia to provide about 4 to 17 moles thereof per mole of said metal, and recovering the uniformly impregnated carrier.

2. A method as defined in claim 1 wherein said carrier is essentially alumina gel.

3. A method as defined in claim 1 wherein said carrier is alumina gel coprecipitated with between about 3% and 15% by weight of silica gel.

4. A method for preparing a catalyst consisting essentially of a granular adsorbent carrier, and uniformly distended thereon minor proportions of the oxides of molybdenum and a metal selected from the class consisting of cobalt and nickel, said granular carrier having an average particle diameter between about ⅛ inch and one inch, which comprises calcining said carrier to expel substantially all water and adsorbed gases and to render said carrier adsorbent, contacting the resulting calcined carrier with dry ammonia at a temperature between about 0° and 200° F., and continuing the contacting until said carrier is substantially saturated with ammonia, then immersing the resulting ammonia-saturated carrier in an aqueous impregnation solution comprising (1) ammonium molybdate, (2) a salt of said metal, and (3) sufficient ammonia to provide about 4 to 17 moles thereof per mole of said metal, allowing said ammonia-saturated carrier to remain in contact with said impregnation solution for a period of time sufficient to obtain uniform saturation, and draining, drying and calcining the impregnated carrier.

5. A process as defined in claim 4 wherein said metal is cobalt.

6. A process as defined in claim 4 wherein said metal is nickel.

References Cited in the file of this patent

UNITED STATES PATENTS

| | | |
|---|---|---|
| 2,456,576 | Bodkin et al. | Dec. 14, 1948 |
| 2,484,258 | Webb et al. | Oct. 11, 1949 |
| 2,486,361 | Nahin et al. | Oct. 25, 1949 |
| 2,517,707 | Payne | Aug. 8, 1950 |
| 2,713,037 | Kimberlin | July 12, 1955 |
| 2,782,144 | Pardee | Feb. 17, 1957 |